Figure 1:
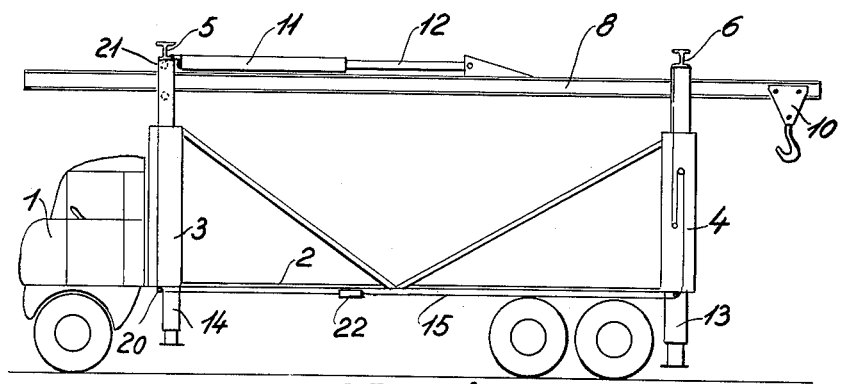

Oct. 12, 1965  P. L. NISSEN ETAL  3,211,306
LOAD CARRYING VEHICLE

Filed Sept. 4, 1963  2 Sheets-Sheet 1

INVENTORS
Peter L. Nissen
BY Svend A. Kersgard
Watson, Cole, Grindle & Watson
ATTORNEYS Oct. 12, 1965   P. L. NISSEN ETAL   3,211,306
LOAD CARRYING VEHICLE
Filed Sept. 4, 1963                                            2 Sheets-Sheet 2

INVENTORS
Peter L. Nissen
BY Svend A. Kersgard
Watson, Cole, Grindle & Watson
ATTORNEYS

United States Patent Office 3,211,306
Patented Oct. 12, 1965

3,211,306
LOAD CARRYING VEHICLE
Peter List Nissen, Gennemlobet 11, Copenhagen-Vanlose, Denmark, and Svend Aage Kersgard, 19 Old Mamaroneck Road, White Plains, N.Y.
Filed Sept. 4, 1963, Ser. No. 306,529
Claims priority, application Denmark, Sept. 8, 1962, 3,934; Oct. 12, 1962, 4,439
1 Claim. (Cl. 214—75)

This invention relates to a load carrying vehicle of the type comprising a platform, a track supported in a position above the longitudinal axis of the vehicle by means of lateral posts connected with each other by means of traverses, and a hook suspended from said track and being movable along the length thereof.

In a known load carrying vehicle of this type, the hook is suspended from the track by means of a tackle having a wire extending to the front end of the platform where the wire is associated with another tackle, one block of which is attached to the track while its other block is movable by means of a hydraulic cylinder. The provision of such a tackle between the hook and the track reduces the lifting height of the hook and besides arrangements must be made to prevent the hook from moving in the longitudinal direction of the track as a consequence of the pull occurring in the hoisting wire when the hydraulic cylinder at the front end of the platform moves the two blocks of the tackle at the front end of the platform away from one another.

It is the object of the invention to devise a load carrying vehicle of the type descibed in which the hook has a great lifting height relative to the platform and where no special arrangements have to be made to prevent longitudinal movement of the hook during the lifting and lowering of a load. This is obtained according to the invention by constructing the posts carrying the track in the form of hydraulic jacks. Thus, according to the invention, a load carrying vehicle of the type referred to comprises a platform, at least two pairs of vertically disposed hydraulic jacks each having a stationary part and a movable part extending vertically upwards therefrom, said jacks being located adjacent the sides of said platform and each pair of jacks being located in a transverse plane with respect to the longitudinal direction of said vehicle, a traverse connecting the upper ends of the movable parts of the jacks of each pair, a track carried by said traverses in a position above the longitudinal axis of said platform, a carriage movable along the length of said track, and hook means carried by said carriage.

In a load carrying vehicle according to the invention, the lifting and lowering of a load is thus effected by lifting and lowering the track so that the hook may be arranged practically immediately below the track because no form of hoisting mechanism has to be provided between the hook and the track. The space under the track may therefore be utilized more efficiently than in the known vehicles referred to. Moreover, the hook is not subjected to forces in the longitudinal direction of the track from any hoisting mechanism during lifting and lowering of a load, so that no special arrangements have to be made to hold the hook against movement longitudinally of the track.

According to the invention, the track is preferably mounted for longitudinal movement in supports at the middle of said traverses. Hereby the field of use of the vehicle is widened seeing that it may also be used as stacking equipment e.g. for lifting a load and moving it rearwards from the vehicle e.g. to be deposited on a loading platform. For the purpose of moving the track, the latter may according to the invention be connected with one of said traverses by means of a hydraulic jack. A further advantage of making the track longitudinally movable is that when the vehicle is driving, the rear end of the track may be moved into line with the rear end of the platform while the front end of the track may then extend above the cab of the vehicle where it will be of no inconvenience.

It will be understood that when a heavy load is suspended on the hook in a position behind the platform, the frontmost jacks may be subjected to an upwardly directed force. This may be counteracted according to the invention by mechanically or hydraulically interconnecting the frontmost and the rearmost jacks, whereby these will at the same time be synchronized in their movements. The invention also comprises suitable arrangements for thus interconnecting the frontmost and rearmost jacks at either side of the vehicle.

According to the invention, the vehicle may be constructed with hydraulic supporting legs at the front and rear ends of the platform. The supporting legs at the rear end may be useful in providing a support behind the rear wheels so that the virtual axis of tilting of the vehicle will be located more to the rear, and the supporting legs at both ends of the vehicle may be used for levelling the platform and thereby the track so that movement of the hook along the latter will be facilitated.

Figure 2:
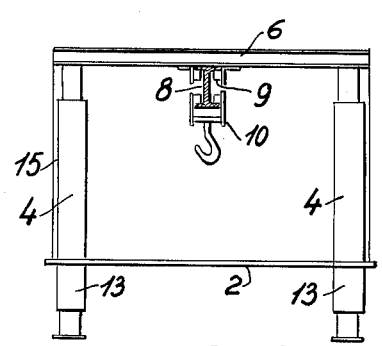
Figure 3:
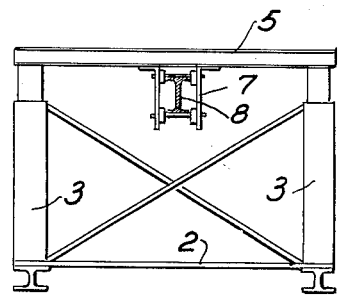
Figure 4:
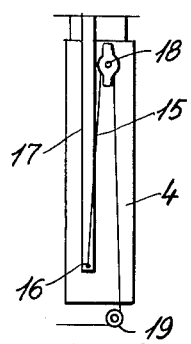
Figure 5:
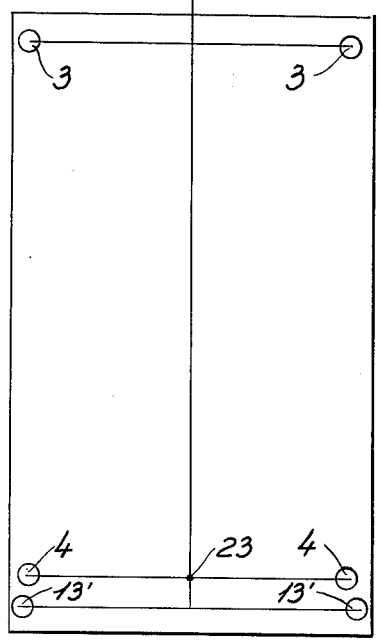
Figure 6:
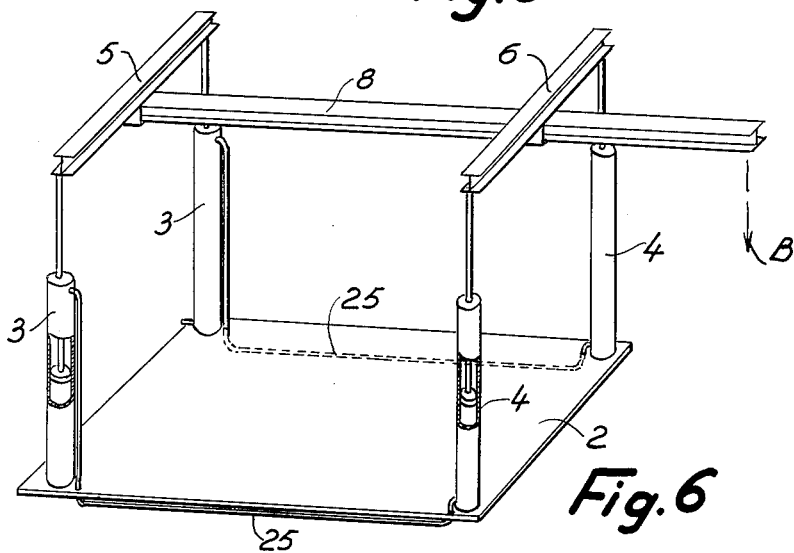

The invention will now be described in further detail with reference to the accompanying drawings in which:

FIG. 1 shows one form of a load carrying vehicle according to the invention, in side view, FIG. 2 the loading equipment of the vehicle as viewed from the rear end, FIG. 3 the same as viewed from the front end, FIG. 4 part of the loading equipment on an enlarged scale, FIG. 5 a diagram of the hydraulic system of the loading equipment, and FIG. 6 a modified form of the loading equipment according to the invention, in perspective view.

In the drawing, 1 is the cab of a truck and 2 is the platform of same. The frame of the truck is in part omitted from the drawing in order to simplify the illustration. At each of the corners of the platform, a vertically disposed hydraulic jack is provided. Of these only the two jacks at the left hand side of the platform are shown in FIG. 1, the frontmost jack being denoted by the reference character 3 and the rearmost jack by the reference character 4.

The two frontmost jacks 3 are interconnected at their upper ends by means of a traverse 5 to form a gate as shown in FIG. 3 and the two rearmost jacks are interconnected by means of a similar traverse 6 as shown in FIG. 2. At its middle, the frontmost traverse 5 carries a diagrammatically indicated roller bearing 7 for supporting a track 8 in the form of an E-bar, and this is also supported by a roller bearing 9 carried by the rearmost traverse 6. The bearing 9 is constructed in such a manner as to permit passage of a carriage 10 adapted to be moved by hand along the length of the track.

The track 8 is connected with the frontmost traverse 5 by means of a hydraulic cylinder 11 with piston and piston rod 12 by means of which the track 8 can be moved longitudinally in the bearings 7 and 9 whereby the rear end of the track may be placed in line with the rear end of the platform or more or less rearwardly thereof depending on the position of the load to be lifted.

As is apparent from FIG. 2, two supporting legs 13 are provided under the rear end of the platform 2. These supporting legs are in the form of hydraulic jacks which may be urged against the ground when heavy loads have to be lifted, whereby the counter moment of the vehicle is increased.

For levelling the vehicle, a single supporting leg or two supporting legs 14 are also provided under the front end of the platform. By adjusting the legs 13 and 14, the platform and thereby the track 8 may be levelled to horizontal position whereby the handling of a load suspended from the carriage 10 is facilitated.

The two jacks 3 and 4 at either side of the platform are interconnected by means of a wire 15. One end 16 of this wire is attached to the lower end of a rod 17 connected with the movable part of the jack 4, and from this point of attachment the wire 15 extends upwards around a roller 18 mounted at the upper end of the stationary part of the jack 4. From the roller 18, the wire extends downwards around a further roller 19 and then forwards along the marginal edge of the platform to the frontmost jack 3 at the same side, where the wire 15 passes around a further roller 20, FIG. 1, from which the wire 15 proceeds directly to the movable part of the jack 3 where the other end 21 of the wire is also attached.

If the hydraulic jacks 3 and 4 are expanded to lift the track 8 and thereby a load suspended from the carriage 10, the rod 17 is moved upwards, whereby the other end of the wire 15 is permitted to move upwards together with the frontmost jack. In this manner the jacks 3 and 4 are synchronized and moreover, if the burden is in a position rearwardly of the vehicle, the wire 15 may take up at least part of the upwardly directed force to which the frontmost traverse 5 is subjected from the carriage as a result of the moment of the load about the bearing of the rearmost traverse 6. A tightening device 22 is provided in each of the wires 15.

The four jacks 3, 3 and 4, 4 are operated simultaneously by means of a valve 23, FIG. 5, of a hydraulic system fed from a continuously rotating pump driven by the motor of the truck. The two rear supporting legs 13 are operated by two independent valves 13′, FIG. 5, and the hydraulic cylinder 11 is operated by a valve 11′. Since the legs and the jacks 3 and 4 are stationary with respect to the truck, the pressure oil may be supplied by means of stiff pipe connections so that the only movable connection required in the embodiment shown is an oil hose to the hydraulic cylinder 11 since this moves up and down when the jacks 3 and 4 are operated.

Besides for loading and unloading the platform of the truck, the loading equipment illustrated may also be used for the stacking of freight or the lifting of freight on to loading platforms and the like, seeing that a load after having been hooked onto the carriage may be moved rearwards e.g. into a building or to a position above a loading platform by operation of the cylinder 11.

The traverses 5 and 6, besides supporting the track 8, may be utilized for supporting a roof which is thus lifted and lowered together with the track and will protect articles placed on the platform.

In the embodiment illustrated in FIG. 6, the lower ends of the cylinders of the two frontmost jacks 3 are connected to the oil pump, not illustrated, and the upper ends of the two frontmost cylinders are connected through pipes 25 to the lower ends of the cylinders of the two rearmost jacks 4. The two frontmost jacks 3 are double-action jacks while the two rearmost jacks 4 are single-action jacks, and the effective piston area of the rearmost jacks is equal to the upper effective piston area of the two frontmost jacks 3.

The loading equipment shown in FIG. 6 operates as follows:

When a quantity of oil is supplied to the lower ends of the cylinders 3, the pistons in these cylinders are moved upwards and will thereby displace a quantity of oil from the upper ends of the frontmost cylinders to the lower ends of the rearmost cylinders where the quantity of oil thus supplied will produce an upward movement of the pistons in the rearmost cylinders. Owing to the equality of piston areas referred to, the upward movement of the pistons in the rearward cylinders will be equal to the upward movement of the pistons in the frontmost cylinders.

If a load B is suspended in the position shown, the rearmost traverse 6 will be subjected to a downward force which is equal to the weight of the load plus a tilting force resulting from the location of the load B behind the traverse 6. The frontmost traverse 5 is subjected to an upward force resulting from the tilting moment. If the friction of the system is disregarded, it will be seen that the tilting force acting on the rearmost traverse 6 will give rise to a pressure in the rearmost cylinders which via the pipes 25 will be transmitted to the upper sides of the pistons in the frontmost jacks 3, where the oil will exert a downward force compensating for the upward tilting force acting on the frontmost traverse 5. The downward force on the rearmost traverse 6 resulting from the weight of the burden B will also give rise to a pressure in the rearmost cylinders 4 which is transmitted to the upper side of the pistons in the frontmost cylinders 3 and to obtain equilibrium it will be seen that the pressure to be maintained in the lower ends of the cylinders 3 should be just high enough to subject the underside of the pistons in the cylinders 3 to a force equal to the weight of the load B. If the frontmost jacks and the rearmost jacks were separately connected to the pump, the latter would have to provide a pressure in the rearmost jacks high enough to take up both the force on the rearmost traverse 6 resulting from the weight of the load B and the tilting force produced by the load.

It will be understood that a pumping force somewhat higher than that indicated will be required for moving the system because an excess force will be needed for accelerating the movable parts of the system and for overcoming frictional forces.

We claim:

A load carrying vehicle comprising a platform, a pair of vertically disposed double-action hydraulic jacks near the front end of said platform and a pair of vertically disposed single-action hydraulic jacks near the rear end of said platform, each jack having a stationary cylinder and a movable piston with piston rod extending vertically upwards therefrom, said jacks being located adjacent the sides of said platform and each pair of jacks being located in a transverse plane with respect to the longitudinal direction of said vehicle, the space below the piston of each jack of the frontmost pair being connected to a pump, the space above the piston of each of said frontmost jacks being connected to the space below the piston of a different one of said rearmost jacks, the effective piston area of said rearmost jack being equal to the effective upper piston area of said frontmost jack, a traverse connecting the upper ends of the piston rods of the jacks of each pair, a track carried by said traverses in a position above the longitudinal axis of said platform, a carriage movable along the length of said track, and hook means carried by said carriage.

References Cited by the Examiner

UNITED STATES PATENTS

| 2,074,148 | 3/37 | Hott | 187—8.59 X |
| 2,831,588 | 4/58 | Seed | 214—38.40 |
| 2,915,206 | 12/59 | Doswell. | |

FOREIGN PATENTS 500,942  11/54  Italy.

GERALD M. FORLENZA, *Primary Examiner.*

HUGO O. SCHULZ, *Examiner.*